Sept. 24, 1940.  V. W. SHERMAN  2,215,667
RECTIFIER
Filed Feb. 18, 1939
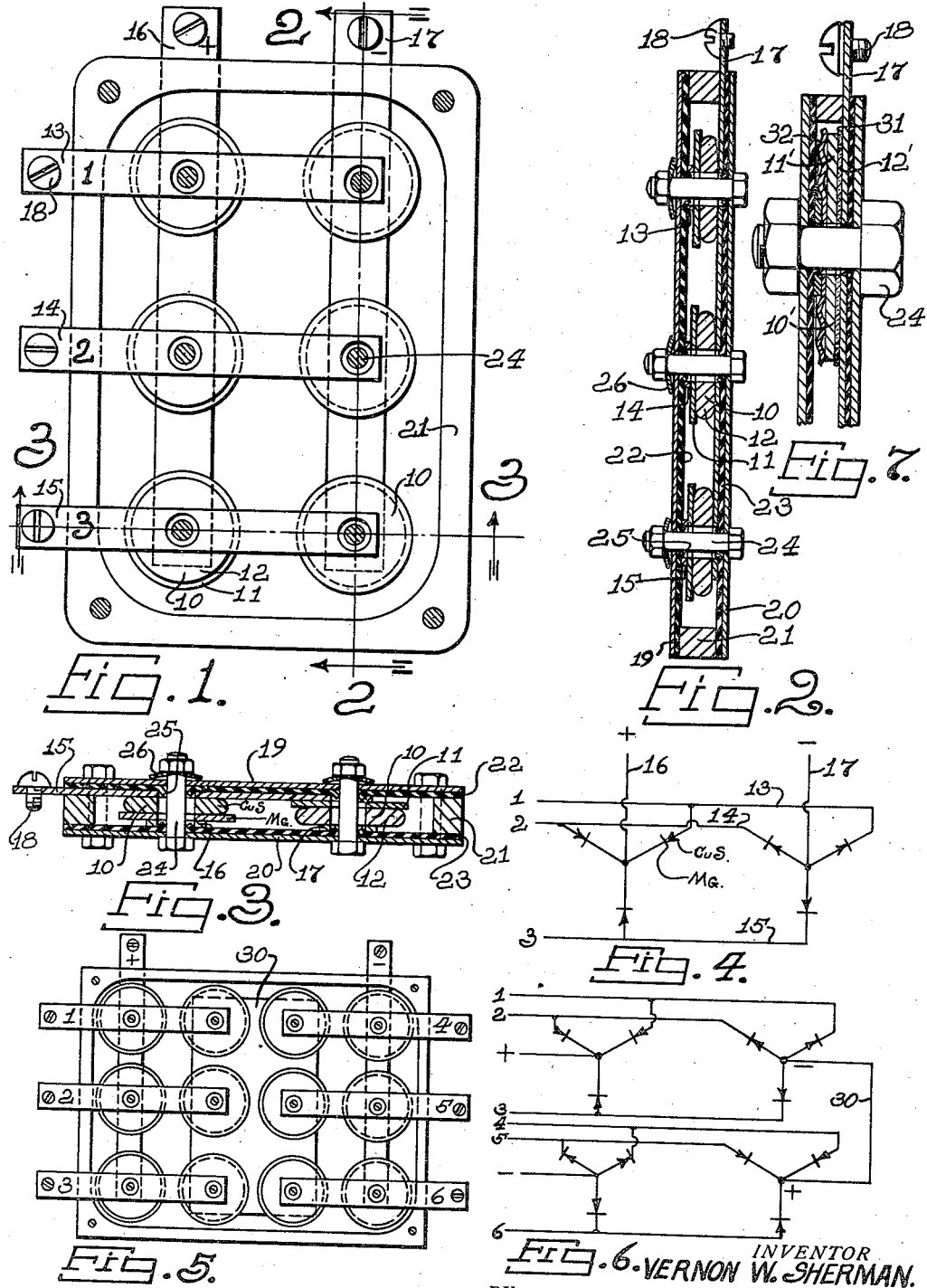
INVENTOR
VERNON W. SHERMAN.
BY Harness, Lind, Patee & Harris
ATTORNEYS Patented Sept. 24, 1940

2,215,667

UNITED STATES PATENT OFFICE 2,215,667

RECTIFIER

Vernon W. Sherman, Detroit, Mich., assignor to Chrysler Corporation, Highland Park, Mich., a corporation of Delaware Application February 18, 1939, Serial No. 257,058

5 Claims. (Cl. 175—366)

This invention relates to dry disc rectifiers of the type wherein an asymmetric current conducting function is obtained at the surface between two dissimilar materials.

Rectifiers of this type are usually constructed by assembling together a plurality of so-called "asymmetric electric couples" or "cells" in stacked relation. Each of the asymmetric couples may consist of a body of electro-positive material, such as magnesium, employed as one electrode element, disposed in electrical contact with a body of electro-negative material, such as copper sulfide, employed as the other electrode element. Such rectifiers depend for their operation upon the resistance and current blocking characteristics of the film which forms at the junction of the electrode elements as the result of electrochemical action.

The present invention has for its objects to provide a device of the character described which may be more economically manufactured, which is more compact and which has a greater capacity for continuous service than those of the prior art.

For a specific embodiment of the invention, reference is made to the accompanying drawing in which like reference characters designate like parts in the following specification and in which:

Fig. 1 is a plan view of the improved rectifier with the top cover plate and insulating layer removed.

Fig. 2 is a sectional view along the line 2—2 of Fig. 1.

Fig. 3 is a sectional view along the line 3—3 of Fig. 1.

Fig. 4 is a circuit diagram of the rectifier of Fig. 1.

Fig. 5 is a view, similar to Fig. 1, but of a slightly modified form of the invention.

Fig. 6 is a circuit diagram of the rectifier of Fig. 5.

Fig. 7 is a fragmentary view of a modified form of the invention.

Referring to Figs. 1 and 3 of the drawing, the numeral 10 designates generally one of the electric couples or cells, referred to above, which comprises a magnesium washer 11 disposed in electrical contact with a copper sulfide washer 12. The rectifier illustrated in Fig. 1 is of the three phase type and is capable of full wave rectification. The contact strips 13, 14 and 15 are adapted to be connected to each of the respective phases of a three phase alternator and each strip has contact with opposite sides of two of the couples as can be seen in Fig. 3. A pair of similar contact strips 16 and 17 serve as positive and negative terminals respectively, as well as to connect together the respective positive and negative sides of the couples as shown in Fig. 2. These contact strips may comprise non-polarizing material such as carbonized silver or nickel plated steel and are provided at their ends with suitable connecting screws 18, or they may be formed of any suitable conductive material.

The rectifying couples are housed in a moisture proof container which comprises the upper and lower cover plates 19 and 20 of metal and the sealing gasket or filler 21 which may be of any suitable fibrous material.

During assembly, a fiber mat insulator 22 is placed between the upper cover plate 19 and the contact strips 13, 14 and 15, while a similar mat 23 is disposed between the lower cover plate 20 and the contact strips 16 and 17. As can be seen from the drawing, the bolts 24, which retain the parts in assembled relation, are of smaller diameter than the holes in the couples 10. By punching holes in the fiber mats 22 and 23 of slightly smaller diameter than the bolts, a flange 25 may be formed which not only insulates the electrical elements from the bolts 24 thereby preventing short circuits, but also helps to position the various parts in the correct location.

Uniform contact pressure is obtained by means of the spring washers 26 which may be tightened by the bolts 24.

The modification illustrated in Fig. 5 is similar to that just described except that it is adapted to rectify current from two separate three phase sources in such a manner that the rectified voltages are additive. The mechanical construction of the Fig. 5 unit is exactly the same as the Fig. 1 unit described above except as to size. The Fig. 5 unit in reality consists of two of the Fig. 1 assemblies mounted in a single casing with a contact plate (designated 30 in Figs. 5 and 6) provided to complete the electrical circuit.

Fig. 7 illustrates a modification of the invention which is particularly adapted for use in installations where extreme compactness is required. For the sake of clarity, Fig. 7 has been drawn to a scale approximately twice that of Fig. 2, it being understood that the form of rectifier shown in Fig. 7 is actually only approximately one-half the thickness of that illustrated in Figs. 2 and 3.

In the Fig. 7 rectifier an extremely thin asymmetric couple is used. This couple is indicated by the numeral 10' and comprises an electropositive element 11' of magnesium and an electronegative element 12' which consists of the reaction product formed by electro-chemical reaction between magnesium and copper sulfide.

In manufacturing such a couple, a magnesium disc and a copper sulfide disc are clamped together and alternating current is passed through the assembly for a time sufficient to form a current blocking film between the two discs which are then broken apart. The magnesium disc will be found to have fused upon its surface a thin layer of copper sulfide. The rectifying film is located at the interface between the sulfide and the magnesium disc.

In Fig. 7 this layer of copper sulfide, indicated by the numeral 12', has been exaggerated in thickness for the sake of clarity, in reality it being in the nature of a thin film. The construction of the Fig. 7 rectifier is essentially the same as that of Fig. 2 except that an insulating washer 31 is provided to prevent contact between the electro-positive side of the couple 11' and the contact strips. This insulation may be made necessary by the extreme thinness of the layer 12', and can comprise a thin film of enamel or other insulating coating material.

A spring washer 32 maintains a uniform pressure on the couple thereby assuring positive contact between the elements thereof.

My improved rectifier just described possesses marked advantages over those of the prior art. The use of flat strip pressure connectors in the internal circuit facilitates cooling, permits better sealing against moisture, allows individual uniform pressure to be maintained at the various junctions and lowers the cost of the unit.

Having described my invention, what I claim as new and desire to secure by Letters Patent is set forth in the following claims.

I claim:

1. A dry type, thin film rectifier comprising a plurality of pairs of similar asymmetrical current conducting cells arranged flatwise between container walls, the cells of each pair being reversed with respect to each other and connected by a thin, flat contact strip, additional thin, flat contact strips connecting together respectively one of the electro-positive elements of each pair of cells and one of the electro-negative elements of each pair of cells.

2. A dry type, thin film rectifier comprising a plurality of pairs of similar asymmetrical current conducting cells arranged flatwise between container walls, the cells of each pair being reversed with respect to each other and connected by a thin, flat contact strip, additional thin, flat contact strips connecting together respectively one of the electro-positive elements of each pair of cells and one of the electro-negative elements of each pair of cells, a layer of compressible insulating material disposed between each of said contact strips and said container walls and means for maintaining said assembly united under pressure.

3. A dry type, thin film rectifier comprising a plurality of pairs of similar asymmetrical current conducting cells arranged flatwise between container walls, the cells of each pair being reversed with respect to each other and connected by a thin, flat contact strip, additional thin, flat contact strips connecting together respectively one of the electro-positive elements of each pair of cells and one of the electro-negative elements of each pair of cells, one end of each of said contact strips projecting outside of said container.

4. A full wave, six phase, dry surface contact rectifier comprising six pairs of asymmetrical current conducting cells arranged flatwise, the cells of each pair being reversed with respect to each other and connected together by a thin, flat contact strip, contact strips connecting together the electro-negative elements of the other three of said cells, and a contact plate connecting together each of the electro-negative elements of the first group of cells with each of the electro-positive elements of the second group of cells.

5. A polyphase, full wave rectifier of the dry surface contact type comprising a plurality of pairs of asymmetrical current conducting cells arranged flatwise, the cells of each pair being reversed with respect to each other, a plurality of contact strips connecting the electro-positive element of one of the cells of each pair with the electro-negative element of the other cell thereof, a contact strip connecting together one of the electro-positive elements of each pair of cells, a contact strip connecting together one of the electro-negative elements of each pair of cells.

VERNON W. SHERMAN.